United States Patent
Jivanjee, Jr.

(10) Patent No.: US 8,342,427 B1
(45) Date of Patent: Jan. 1, 2013

(54) LAWN AND TREE FERTILIZING DEVICE INSTALLABLE ON SPRINKLER SYSTEM

(76) Inventor: Mehboob H. Jivanjee, Jr., Miami, FL (US)

( * ) Notice: Subject to any disclaimer, the term of this patent is extended or adjusted under 35 U.S.C. 154(b) by 373 days.

(21) Appl. No.: 12/701,072

(22) Filed: Feb. 5, 2010

(51) Int. Cl.
*A62C 5/02* (2006.01)
(52) U.S. Cl. .................................. 239/310; 239/379
(58) Field of Classification Search .......... 239/310, 239/302, 315, 316, 569, 379
See application file for complete search history.

(56) References Cited

U.S. PATENT DOCUMENTS

| | | | |
|---|---|---|---|
| 3,833,177 A | | 9/1974 | Pasley et al. |
| 4,750,512 A | * | 6/1988 | Craig ............... 137/268 |
| 4,898,202 A | * | 2/1990 | Craig ............... 137/268 |
| 4,908,190 A | * | 3/1990 | Maglio et al. ........ 422/276 |
| D325,328 S | | 4/1992 | Smiley |
| 5,364,030 A | * | 11/1994 | Murdock et al. .......... 239/310 |
| 5,730,364 A | | 3/1998 | Gertie |
| 2002/0145057 A1 | | 10/2002 | Leedy et al. |
| 2006/0202057 A1 | | 9/2006 | Taggart et al. |

OTHER PUBLICATIONS www.ridsystem.com; Retrofit Irrigation Distribution System; as of Feb. 5, 2010; Internet.

* cited by examiner

*Primary Examiner* — Davis Hwu

(57) ABSTRACT

A fertilizing device for installing in a water system comprising a first half housing removably attached to a second half housing; an intake pipe disposed on a first side and an outlet pipe disposed on a second side of the first half housing, the intake pipe and outlet pipe are both fluidly connected to the inner cavity of the first half housing; a box with apertures disposed in the first and second half housings for holding a chemical bar with fertilizer; wherein the intake pipe is connected to a first portion of a pipe of the water system, the outlet pipe is connected to a second portion of the pipe of the water system; wherein water from the water system can enter the intake pipe, mix with the chemical bar, and exit via the outlet pipe.

15 Claims, 4 Drawing Sheets

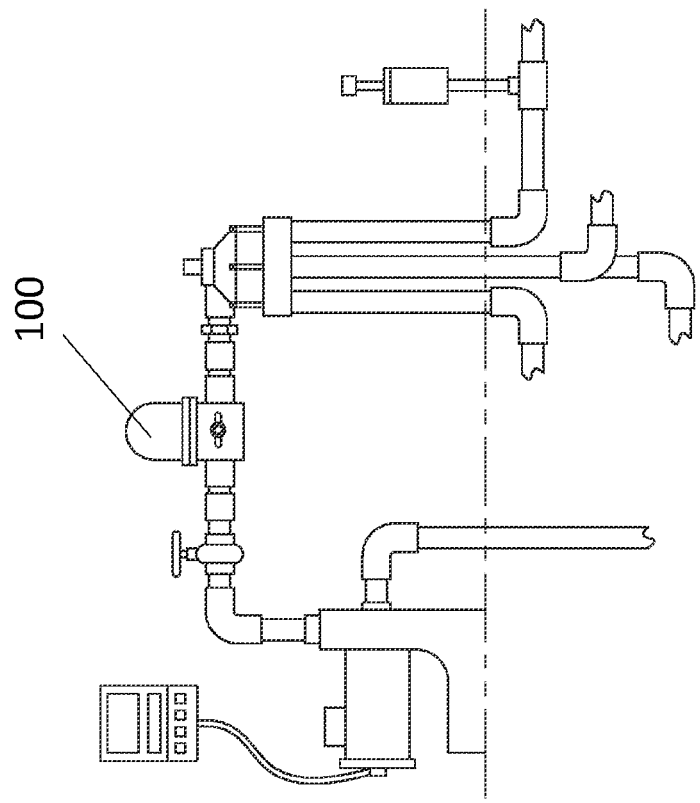
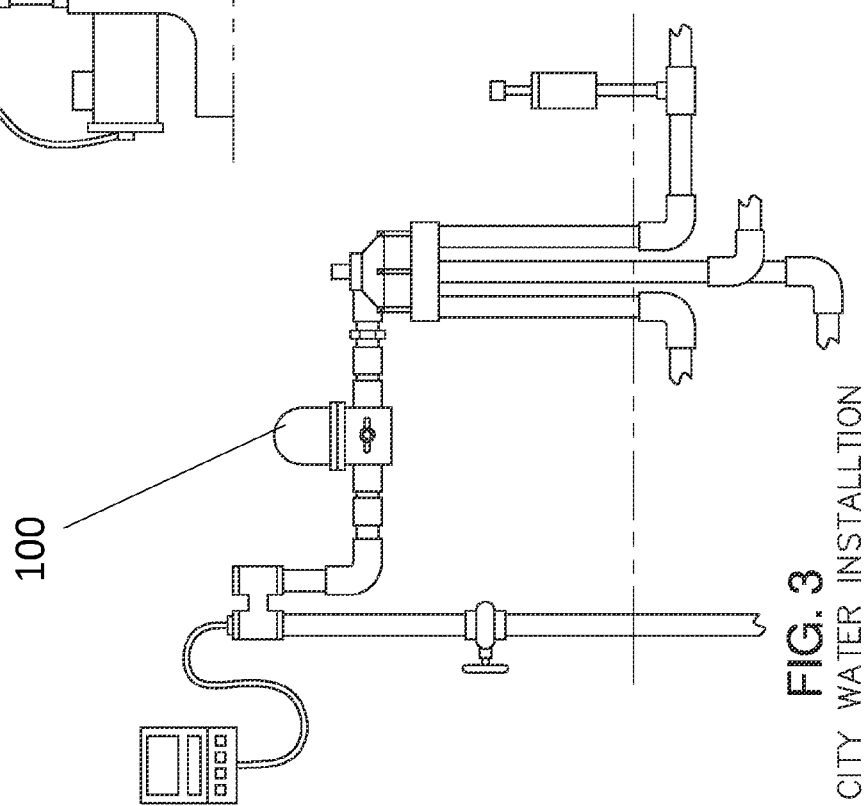

LAWN AND TREE FERTILIZING DEVICE INSTALLABLE ON SPRINKLER SYSTEM

FIELD OF THE INVENTION

The present invention is directed to a fertilizing device for fertilizing landscaping such as trees or lawns, or for dispersing insect repellant. More particularly, the present invention is directed to a fertilizing device that can be installed on an existing sprinkler system.

BACKGROUND OF THE INVENTION

Fertilizing a lawn or other area with vegetation can be time consuming. The present invention features a device that can easily be installed on an existing water system (e.g., water pump, sprinkler, etc.) that can allow for the simultaneous watering and fertilizing of a lawn (or other area).

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 3 is a side view of the device of the present invention, wherein the device is installed in a system such as a city water system.

FIG. 4 is a side view of the device of the present invention, wherein the device is installed in a system such as a water pump.

DESCRIPTION OF PREFERRED EMBODIMENTS

Figure 1:
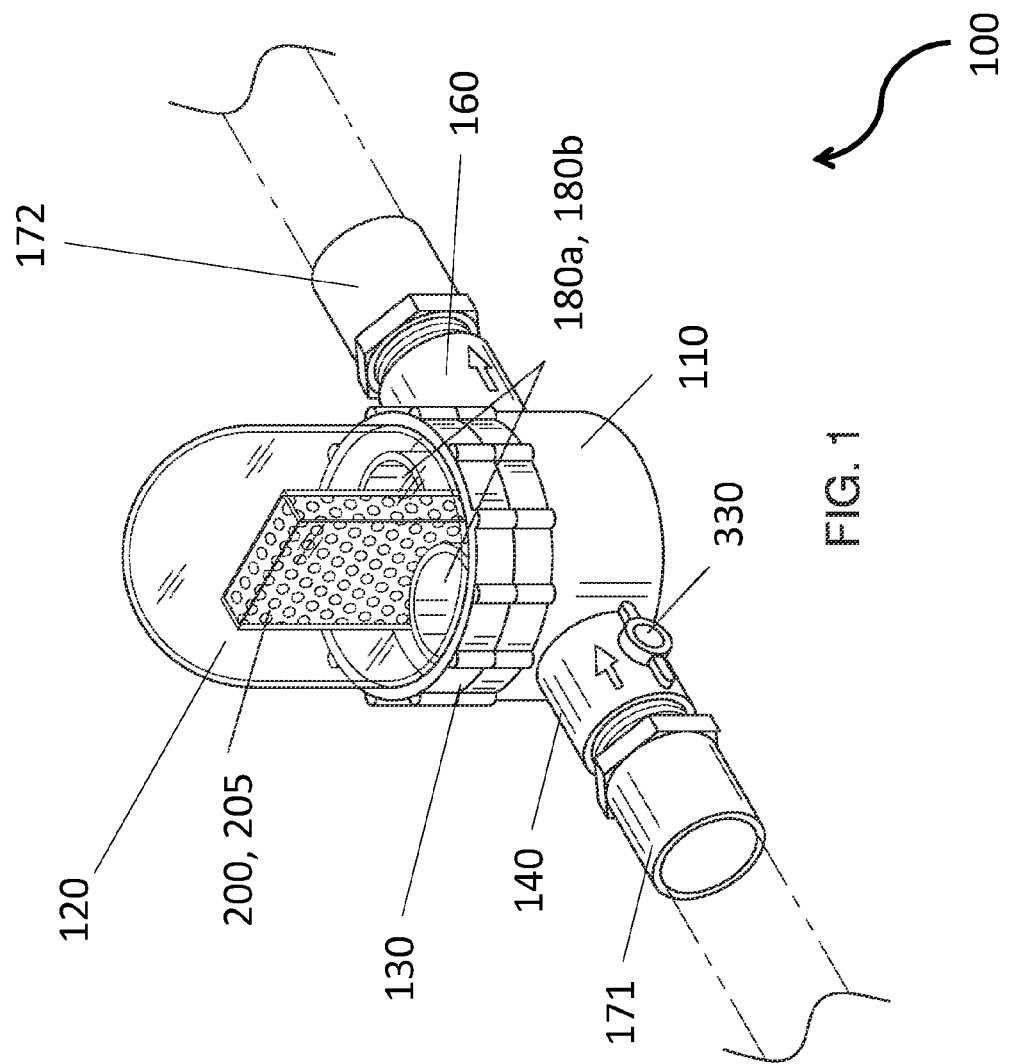
FIG. 1 is a perspective view of the fertilizing device of the present invention.
Figure 2:
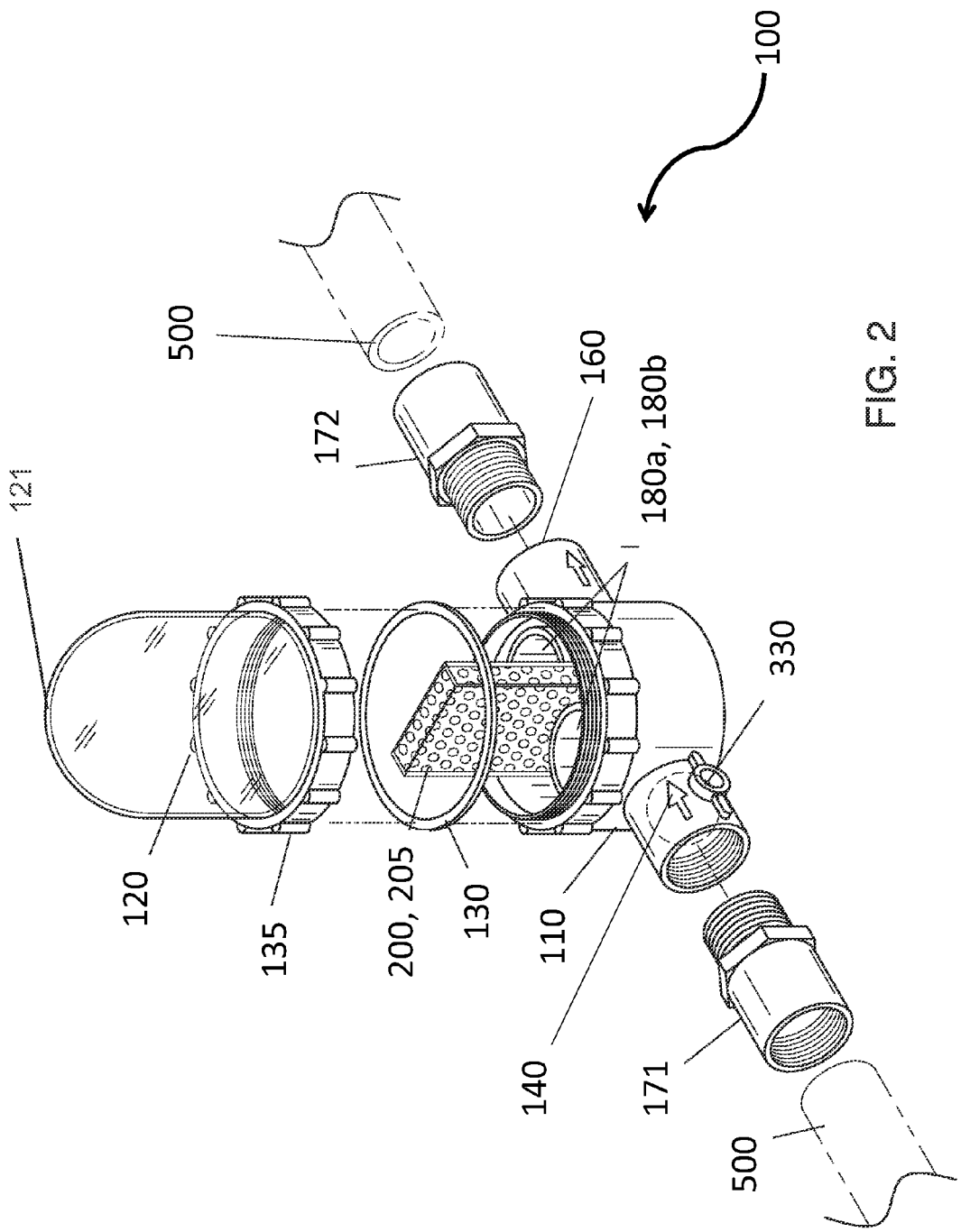
FIG. 2 is an exploded view of the components of the fertilizing device of the present invention.

Referring now to FIGS. 1-5, the present invention features a lawn fertilizing device 100 for installing in an existing water system such as a sprinkler. The device of the present invention is installed aboveground. In some embodiments, the lawn fertilizing device 100 can be installed with hoses at a home (e.g., see FIG. 5). The fertilizing device 100 allows the lawn to be fertilized at the same time it is watered. The device 100 of the present invention is not limited to use with water hoses at a home. The device 100 may also be used with water system such as city water systems and pumps (e.g., see FIG. 3, FIG. 4).

The fertilizing device 100 comprises a first half housing 110 and a second half housing 120. The second housing 120 has a transparent upper dome 121. The first half housing 100 and second half housing 120 can be separated or removably attached via an attachment means 130. In some embodiments, the attachment means 135 includes a screw mechanism (see FIG. 2), a snap mechanism, a hinge mechanism, the like, or a combination thereof. In some embodiments, a gasket 130 (e.g., a rubber seal) is used to help seal the first half housing 110 and the second half housing 120 together. Gaskets are well known to one of ordinary skill in the art. The half housings (e.g. the first half housing 110, the second half housing 120) both have an inner cavity. In some embodiments, the first half housing 110 is generally cylindrical. In some embodiments, the second half housing 120 is generally hemispherical or the like.

Extending from a first side of the first half housing 110 is an intake pipe 140. Extending from a second side of the first half housing 110 is an outlet pipe 160. The outlet pipe 160 is disposed on the opposite side the intake pipe 140. The intake pipe 140 is fluidly connected to the outlet pipe 160. From a water source, water enters the inner cavity of the first half housing 110 via the intake pipe 140 and exits the housing 110 via the outlet pipe 160.

In some embodiments, the intake pipe 140 is fluidly connected to a first inner pipe 180a disposed in the inner cavity of the first half housing 110. The first inner pipe 180a has a first end fluidly connected to the intake pipe 140 and the second end opens into the inner cavity inner cavity of the first half housing 110 (or second half housing 120). The first inner pipe 180a may be generally curved so as to direct water upwardly when entering the inner cavity of the first half housing 110 (see FIG. 2). In some embodiments, water from the first inner pipe 180a may flow into both the inner cavity of the first half housing 110 and the inner cavity of the second half housing 120.

In some embodiments, the outlet pipe 160 is fluidly connected to a second inner pipe 180b disposed in the inner cavity of the first half housing 110. The second inner pipe 180b has a first end fluidly connected to the outlet pipe 160 and the second end opens into the inner cavity inner cavity of the first half housing 110 (or second half housing 120). The second inner pipe 180b may be generally curved upwardly like the first inner pipe 180a.

In some embodiments, the fertilizing device 100 is for installing in the main pipe 500 of an in-ground sprinkler. To install the device 100, the main pipe 500 is cut, and the intake pipe 140 is connected to the first portion of the main pipe 500 (the first portion being the portion connected to the water source). In some embodiments, the first portion of the main pipe 500 is connected to the intake pipe 140 via a first adapter 171. The first adapter 171 can help create a tight fit between the main pipe 500 and the intake pipe 140. Adapters for this purpose are well known to one of ordinary skill in the art.

The outlet pipe 160 is connected to the second portion of the main pipe 500 (the portion of the main pipe 500 connected to the target such as the sprinkler). In some embodiments, the second portion of the main pipe 500 is connected to the outlet pipe 160 via a second adapter 172. The second adapter 172 can help create a tight fit between the main pipe 500 and the outlet pipe 160.

In some embodiments, the first adapter 171 comprises a male threaded portion on the first end for screwing into a female threaded portion disposed on the intake pipe 140 (or vice versa). In some embodiments, the second adapter 172 comprises a male threaded portion on the first end for screwing into a female threaded portion disposed on the outlet pipe 160 (or vice versa). In some embodiments, the second end of the first adapter 171 and/or the second end of the second adapter 172 fit around the main pipe 500.

The inner cavity of the second half housing 120 and of the first half housing 110 are adapted for holding a chemical, for example a chemical bar 200. In some embodiments, the bar 200 comprises fertilizer, herbicide, and/or insecticide. In some embodiments, a box 205 is disposed in the inner cavity of the first half housing 110 and/or in the inner cavity of the second half housing 120 (e.g., for holding the chemical bar 200). A plurality of apertures may be disposed in the box 205 to allow water to contact the bar 200. For example, water enters the half housings via the intake pipe 140 (and first inner pipe 180a), and the water can flow into the box and contact the chemical bar 200. Water can then exit the half housings via the outlet pipe 160 (and second inner pipe 180b). Water then is delivered to the target (e.g., sprinkler). In some embodiments, the box further comprises a filter. The filter may help prevent large chunks of the chemical bar 200 from breaking off and entering into the outlet pipe 160 before it has been properly dissolved.

In some embodiments, the device 100 of the present invention further comprises a valve for preventing water from flowing into the inner cavities of the first and second half housings. In some embodiments, the valve is disposed in the intake pipe 140, or the valve may be disposed in the first inner pipe 180a. The valve can move between an open position and a closed position for respectively allowing and preventing the flow of water. A valve switch 330 is operatively connected to the valve. The valve switch 330 is a switch that the user can manually move to open and close the valve. The valve switch 330 may be disposed on the intake pipe 140 or on the first half housing 110.

To install the fertilizing device 100 of the present invention, a user can first turn off the main water valve to the existing sprinkler system and cut the main pipe in between the main water valve and the sprinkler. Next, as previously discussed, the user can attach the ends of the main pipe 500 to the intake pipe 140 and the outlet pipe 150. In some embodiments, the user can seal the connections with cement. The user can then remove the second half housing 120 from the first half housing 110 (e.g., by unscrewing) and place a chemical bar 200 into the box 205. The second half housing 120 can then be re-attached to the first half housing 110 via the attachment means 135 (screwed on). Next, the user can turn the main water system on again and then turn on the sprinkler.

Figure 5:
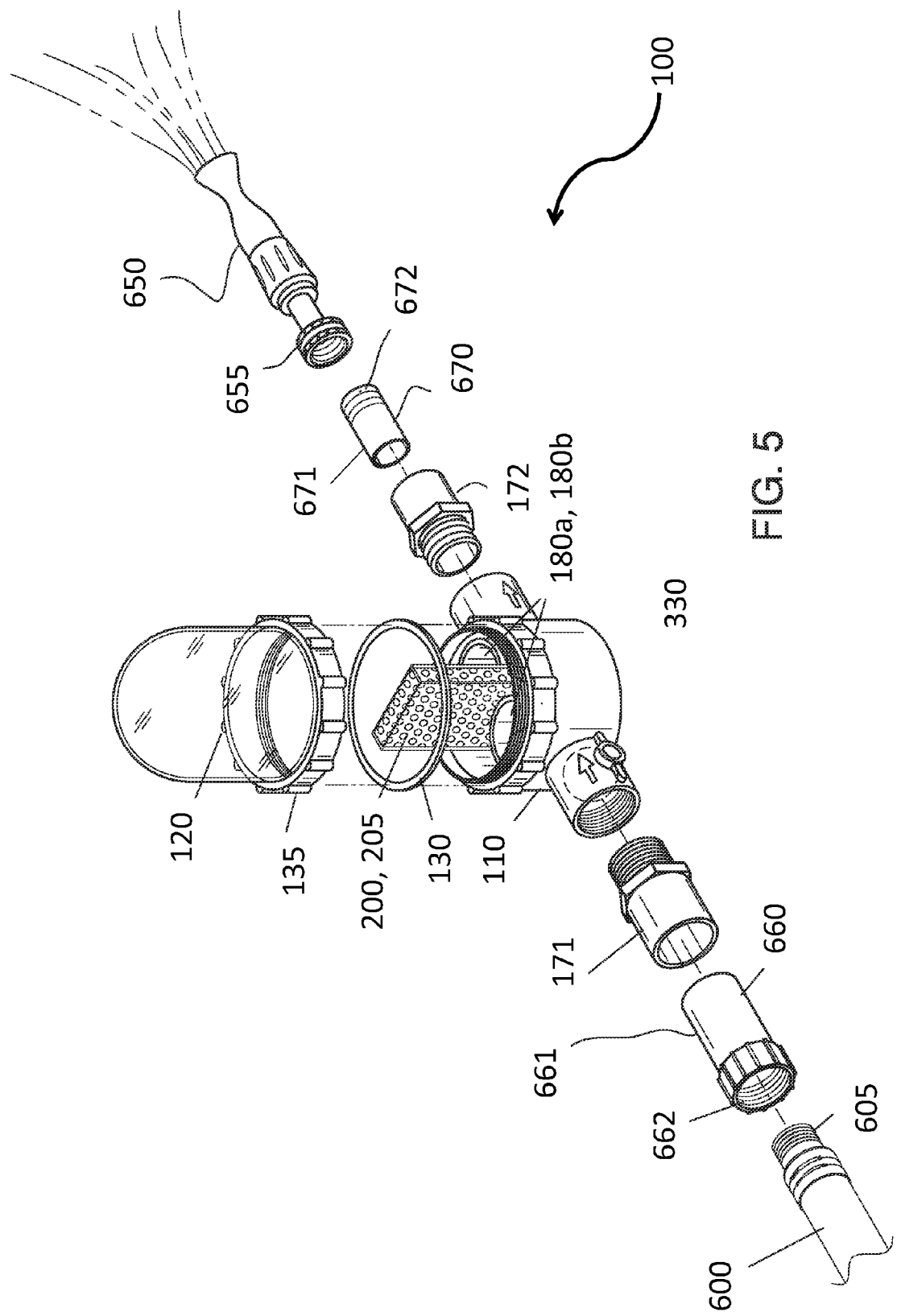
FIG. 5 is an exploded view of components of the fertilizing device of the present invention as installed in a home watering system.

Referring now to FIG. 5, in some embodiments, the fertilizing device 100 is for installing in a hose 600. The intake pipe 140 is connected to the threaded end 605 of the hose 600 (the hose 600 is connected to the water source). The threaded end 605 of the hose 600 may not always fit properly into the intake pipe 140. In some embodiments, the first adapter 171 is attached to the intake pipe 140, and a first hose adapter 660 is used to connect the threaded end 605 of the hose 600 to the first adapter 171. For example, the first end 661 of the first hose adapter 660 slides into the first adapter 171, and the threaded second end 662 of the first hose adapter 660 screws onto the threaded end 605 of the hose 600 (see FIG. 5).

The outlet pipe 160 can be connected to a sprayer component 650 (see FIG. 5). In some embodiments, the sprayer component 650 comprises a threaded end 655, which is screwed onto the outlet pipe 160. The threaded end 655 of the sprayer component 650 may not always fit properly into the outlet pipe 160. In some embodiments, the second adapter 172 is attached to the outlet pipe 160, and a second hose adapter 670 is used to connect the threaded end 655 of the sprayer component 650 to the second adapter 172. For example, the first end 671 of the second hose adapter 670 slides into the second adapter 172, and the threaded second end 672 of the second hose adapter 670 screws onto the threaded end 655 of the sprayer component 650 (see FIG. 5).

Without wishing to limit the present invention to any theory or mechanism, it is believed that the curved inner pipes 180 are advantageous because they provide for a better mixing of the water and the chemical bar before the water exits the device and is delivered to the target.

The following the disclosures of the following U.S. Patents are incorporated in their entirety by reference herein: U.S. Pat. Application No. 2002/0145057; U.S. Pat. Application No. 2006/0202057; U.S. Pat. No. 5,730,364; U.S. Pat. No. 3,833,177; U.S. Pat. No. 5,364,030.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A lawn fertilizing device for installing in a water system, said lawn fertilizing device comprising:
    (a) a first half housing removably attached to a second half housing via a screw mechanism, each half housing having an inner cavity and the inner cavities of each half are fluidly connected after they are screwed together, wherein the second housing has a transparent upper dome;
    (b) an intake pipe disposed on a first side of the first half housing and an outlet pipe disposed on a second side of the first half housing, wherein the outlet pipe is on the opposite side of the intake pipe, wherein the intake pipe is fluidly connected to the inner cavity of the first half housing via a first inner pipe and the outlet pipe is fluidly connected to the inner cavity of the first half housing via a second inner pipe, the first inner pipe being curved upwardly toward the inner cavity of the second half housing, wherein the removable first half housing together with the intake and outlet pipe form a T-shape; further the intake and outlet pipe are positioned opposite of each other with respect to the first half housing;
    (c) a valve disposed in the intake pipe or in the first inner pipe that can move between an open position and a closed position for respectively allowing and preventing water flow to the first half housing and second half housing;
    (d) a box with apertures disposed in first half housing and the second half housing for holding a chemical bar, wherein the chemical bar comprises fertilizer, the aperture allowing water from the inner cavities of the first half housing and the second half housing to enter the box and contact the chemical bar;
wherein the intake pipe is connectable to a first portion of a main pipe of the water system and the outlet pipe is connectable to a second portion of the main pipe of the water system; wherein water from the water system can enter the first half housing via the intake pipe, then mix with the chemical bar, then exit the first half housing via, the outlet pipe.

2. The lawn fertilizing device of claim 1, wherein the water system is a sprinkler.

3. The lawn fertilizing device of claim 1, wherein the water system is a hose.

4. The lawn fertilizing device of claim 1, wherein a gasket is used in combination with the attachment means to seal the first half housing and the second half housing.

5. The lawn fertilizing device of claim 1, wherein the first half housing is generally cylindrical.

6. The lawn fertilizing device of claim 1, wherein the second half housing is generally hemispherical.

7. The lawn fertilizing device of claim 1, wherein a first adapter is used to connect the intake pipe to the first portion of the main pipe of the water system.

8. The lawn fertilizing device of claim 7, wherein a male threaded portion is disposed on a first end of the first adapter, the male threaded portion is for engaging a female threaded portion disposed on the intake pipe.

9. The lawn fertilizing device of claim 7, wherein a female threaded portion is disposed on a first end of the first adapter, the female threaded portion is for engaging a male threaded portion disposed on the intake pipe.

10. The lawn fertilizing device of claim 1, wherein a second adapter is used to connect the outlet pipe to the second portion of the main pipe of the water system.

11. The lawn fertilizing device of claim 10, wherein a male threaded portion is disposed on a first end of the second adapter, the male threaded portion is for engaging a female threaded portion disposed on the outlet pipe.

12. The lawn fertilizing device of claim 10, wherein a female threaded portion is disposed on a first end of the second adapter, the female threaded portion is for engaging a male threaded portion disposed on the outlet pipe.

13. The lawn fertilizing device of claim 1, wherein a valve switch is disposed on the first half housing or on the intake pipe, the valve switch is operatively connected to the valve, the valve switch can move the valve to the open position or the closed position.

14. The lawn fertilizing device of claim 1, wherein a first adapter and a first hose adapter are used in combination to connect the intake pipe 140 to a threaded end of a hose.

15. The lawn fertilizing device of claim 1, wherein a second adapter and a second hose adapter are used in combination with connect the outlet pipe to a sprayer component.

* * * * *